Figure 2:
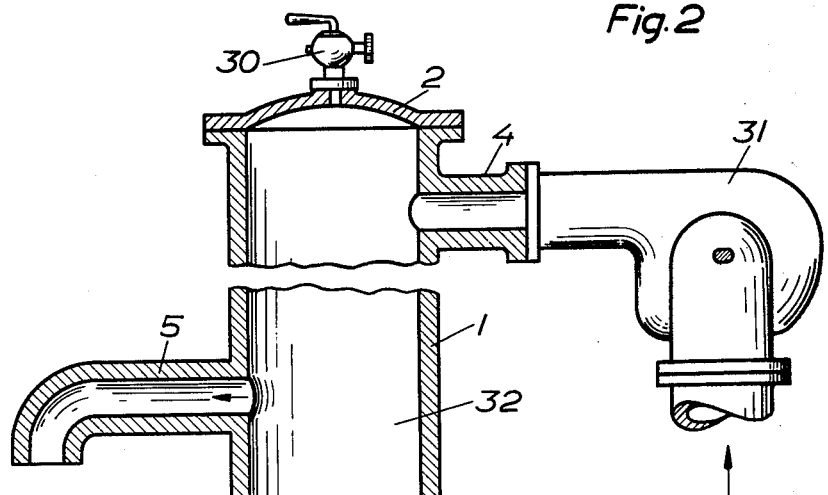

Feb. 8, 1966 P. O. SKOLDBERG 3,233,964
MEANS FOR STERILIZING LIQUID
Original Filed Feb. 8, 1955

INVENTOR
Per Olof Skoldberg
BY
ATTORNEY 3,233,964
MEANS FOR STERILIZING LIQUID
Per Olof Skoldberg, Saltsjo-Duvnas, Sweden, assignor to A. B. Purac, Lund, Sweden, a corporation of Sweden
Continuation of application Ser. No. 486,913, Feb. 8, 1955. This application Mar. 30, 1962, Ser. No. 193,348
Claims priority, application Sweden, Feb. 12, 1954, 1,260/54
7 Claims. (Cl. 21—61)

This invention relates to a method and means for sterilizing liquids, i.e., for destroying or making otherwise inactive bacteria or other cellular organisms in liquids. It has been found that germs or bacteria in a liquid may be killed or at least rendered inactive by subjecting such liquid to pressure shocks of high amplitude and short duration. However, the methods and means disclosed so far are not suitable for handling large volumes of liquids which may be contaminated with impurities and which may be aggressive to the material from which the shock treating apparatus is made.

This application is a continuation of my copending application Serial No. 486,913 filed Feb. 8, 1955, and now abandoned.

One object of the present invention is to provide improved method and means for treatment of large quantities of liquid such as fresh water, waste water, milk or the like. A further object of the invention is to provide a method and means for continuously treating such liquids. A still further object of the invention is to reduce the costs for treating the liquids to a minimum. A still further object is to provide an apparatus in which the parts subjected to destruction are cheap and easily replaceable.

For these and other purposes I provide a process for sterilizing a liquid which comprises forcing a continuous stream of said liquid through a chamber, and delivering shocks to the liquid in said chamber in the form of pressure pulses of high amplitude and short duration, sufficient to inactivate bacteria and small cellular organisms in the liquid. In a preferred form of the invention the shocks are delivered to the fluid by a percussion apparatus including a free reciprocable pneumatic hammer piston. It has been found that the process according to the invention is very suitable for treatment of fresh water, waste water, milk, or the like. According to the intensity or duration of the treatment the sterilization of the liquid may be carried on to any desired degree of sterility or to full sterility so that a suitable reduction of the number of bacteria or other germs in the liquid is obtained.

The method and means according to the invention may also be used for medicinal purposes and the invention is particularly valuable in connection with the sterilization of liquids which may not be heated or treated with chemical means without undergoing a change of composition. The invention may also be used in connection with industrial fermentation or similar processes produced by micro organisms, for instance, when it is desired to interrupt such fermentation or the like at a certain stage.

Figure 1:
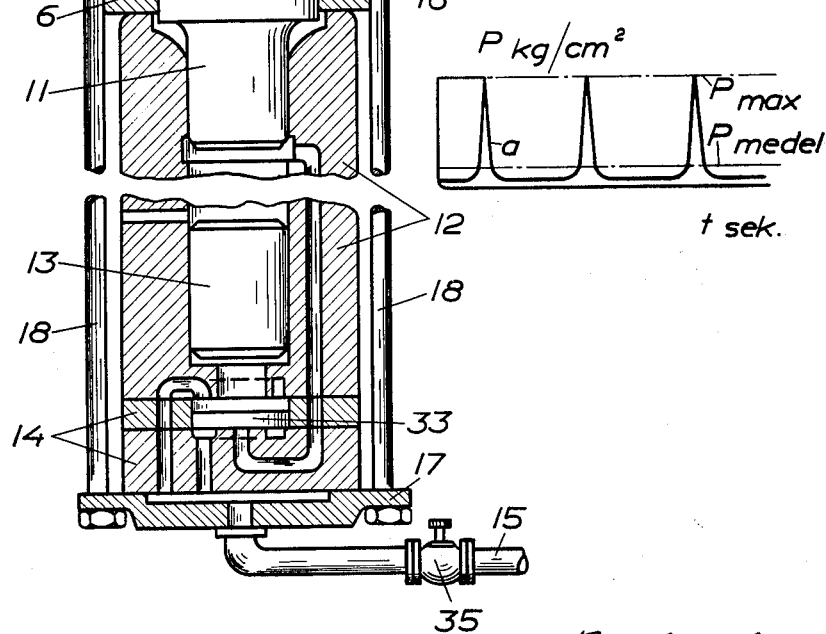

One embodiment of an apparatus for carrying out the method according to the invention together with a diagram is illustrated on the accompanying drawing. FIG. 1 illustrates diagrammatically the pressure variations in a liquid under treatment according to the invention. FIG. 2 illustrates diagrammatically an apparatus for carrying out the method according to the invention.

FIG. 1 illustrates diagrammatically how the pressure varies in a liquid which continuously flows through a chamber in which it is treated and through which the liquid is forced at a suitable preferably low feed pressure. The solid curve $a$ in the diagram illustrates the variations of the pressure in the liquid as they may be assumed to be when the liquid is subjected to pressure pulses according to the invention. As obvious from FIG. 1 the pressure pulses have an amplitude $P_{max}$ which is high in comparison with the mean pressure $P_{medal}$ of the liquid which is substantially the same as the feed pressure. It may occur that pressures below atmospheric also occur in the liquid between the pressure pulses. However, the invention is independent of the theoretical explanations which may be made to explain the effect which the inventor has found, i.e., that bacteria and similar micro organisms in a liquid may be killed or made inactive by continuous shock treatment of the liquid passing a hammering or shock treatment chamber in which the hammering or shocks are produced by a free piston percussion apparatus, for instance a pneumatic or electric free piston hammer having a suitable anvil block for transmitting the hammer blows or shocks to the liquid in the chamber. It may be that the bacteria or the like cannot stand the rapid repeated pressure raises or that the pressure reductions following thereon are the active part of the pressure pulses during the shock treatment or that the combination of the pressure raise and the pressure drop makes the bacteria inactive.

In FIG. 2 an apparatus is illustrated which is intended for continuous treatment of liquids, such as waste water, with pressure pulses according to the invention. The apparatus consists of a long tubular member 1 forming a shock treatment chamber 32 and having a cover 2 at one end and a two-piece cover 3, 16 at the opposite end. The tubular member 1 which in FIG. 2 has the central portion broken away is long relatively to the diameter, for instance many times as long as the diameter. The chamber 32 communicates through an inlet 4 with a feed pump 31 capable of maintaining a suitable pressure in the chamber 32 and is provided with a restricted outlet 5. The apparatus may be incorporated in a fresh water system or a waste water system or in a milk treating plant or other plant which contains a liquid which it is desired to sterilize. The inlet 4 is placed in such a position and may be shaped or arranged in such a way that the pressure pulses moving in the liquid in the chamber 32 are substantially prevented from escaping through the inlet 4 towards the pump 31 which might otherwise be damaged by the pressure pulses. Similar arrangements may be provided in the outlet when it is desired to connect the outlet to a closed conduit system. Special pressure wave filters similar to sound filters may be provided in the inlet and outlet 4, 5 for this purpose. Preferably the inlet and outlet may be carried out valveless. In the illustrated embodiment the pressure pulses are to a certain degree prevented from entering the inlet 4 or outlet 5 which are placed perpendicular to the direction of travel of the pressure pulses in the chamber 32. In the head 3, 16 an anvil block 6 is movable longitudinally of the chamber 32 and fitted with a liquid tight sliding fit in a bore 7 in the head portion 3. The anvil block 6 may have a diameter which is substantially the same as the diameter of the chamber 32. In the illustrated embodiment the anvil block acts directly on the liquid in the chamber 32, but is completely liquid tight against the percussion apparatus. The anvil block has a flange 8 which is disposed between two disc type springs 9 provided in an annular recess 10 in the head portion 16. The springs 9 serve to return the anvil block to the illustrated normal position after each blow. Naturally, the springs 9 may be replaced by air cushions or a chamber under air pressure acting on a suitable piston area formed by the anvil block. The flange 8 might for this purpose be extended towards the cylindrical wall of the recess 10 to move as a piston in the recess 10, a compressed air conduit preferably with pressure regulator being connected between said flange and the head 3. The anvil block 6 has a shank portion 11 which extends into a cylinder 12 of a percussion motor which consists of the cylinder 12, a free reciprocating piston 13 movable in said cylinder, a valve housing 14, a rear head 17, and a suitable control valve member 33. The valve member 33 provided in the valve housing 14 is of the same type as the valves used in pneumatic hammer tools. In the figure the valve member 33 is diagrammatically illustrated as a plain disc but naturally said valve member may be carried out in other ways. Compressed air for driving the percussion motor is supplied through a conduit 15 which is connected to the rear head 17. The percussion motor is fitted between the flange 34 of the tubular member 1 and the rear head 17 by means of bolts 18. 35 indicates the main valve of the percussion apparatus.

In operation of the apparatus according to the invention liquid to be treated is forced through the inlet 4 and the chamber 32 by means of the pump 31. In the chamber 32 the liquid is subjected to repeated shocks delivered by the percussion apparatus through the anvil block 6. In the illustrated embodiment the liquid flows against the percussion waves. The velocity of the liquid stream through the chamber determines the time during which each particle of the liquid is treated and may be regulated according to the desired degree of sterility of the liquid and leaving the chamber. The amplitude $P_{max}$ of the pressure pulses have varied in experiments carried out by the inventor between 1 and 500 kilogrammes/square centimetre. The time of treatment has been varied between a few seconds up to an hour. The frequency of the percussion motor has been in the magnitude 10–50 blows per second and has always been well within the audible limit, i.e., well below 10,000 per second. With regard to the properties of the material to be treated the duration of the treatment and the higher or lower amplitude of the pressure pulses may be selected according to experiments from case to case. Sometimes the same result may be obtained with a high amplitude and a short treatment as with a low amplitude and a longer treatment. In order to make the treatment effective the liquid should as far as possible fill the chamber 32. For this purpose the chamber is preferably provided with a vent cock 30 at the top of the chamber.

The method and apparatus described hereinabove should only be considered as an example and the invention may be varied in several ways within the scope of the claims. The pneumatic percussion apparatus illustrated in FIG. 2 may, for instance, be replaced by a combustion gas driven or electrically driven percussion apparatus.

What I claim is:

1. In sterilizing apparatus for destroying and inactivating bacteria and other micro-organisms in a liquid by generating and propagating pressure waves therein, the combination which comprises a straight tubular chamber having an open liquid inlet and outlet, pump means for continuously feeding liquid to be treated through said chamber by said inlet and outlet thereof, and mechanical percussive impact pulse generating means at one end of said tubular chamber for generating pulses longitudinally of said chamber for propagation through said liquid therein by direct impact on said liquid in said chamber, said pulses being in the range of about 1 to 500 kg. per sq. cm. amplitude and having a frequency within the audible range and well below 10,000 cycles per second.

2. Apparatus as recited in claim 1 in which said mechanical percussion apparatus includes a piston in one end of said chamber and axially reciprocating with respect thereto, and pneumatic percussion motor means for driving said piston to impart said impact pulses to said liquid in said chamber.

3. Apparatus as recited in claim 1 in which vent means are provided in said tubular chamber for assuring the complete filling thereof with said liquid.

4. Apparatus as recited in claim 1 in which said inlet and said outlet of said tubular chamber communicate therewith through the longitudinal walls thereof for inhibiting transmission of said longitudinally directed impact pulses outwardly through said inlet and said outlet.

5. Apparatus as recited in claim 1 in which said liquid outlet has a restricted cross sectional area and in which said pump means maintains a positive feeding pressure on said liquid in said tubular chamber against the action of said restricted outlet.

6. Apparatus as recited in claim 1 in which the longitudinal extent of said tubular chamber is substantially greater than the transverse extent thereof for retaining a quantity of said liquid continuously flowing therethrough for a sufficient time for subjecting said liquid to a substantial number of said impact pulses propagated therethrough.

7. Apparatus as recited in claim 1 in which said frequency of said impact pressure pulses is of the order of about 10–50 impacts per second.

References Cited by the Examiner

UNITED STATES PATENTS

| | | | |
|---|---|---|---|
| 2,138,839 | 12/1938 | Chambers | 99—217 |
| 2,219,348 | 10/1940 | Turner | 21—61 |
| 2,585,103 | 2/1952 | Fitzgerald | 99—217 X |

FOREIGN PATENTS 356,783   9/1931   Great Britain.

A. LOUIS MONACELL, *Primary Examiner.*

ABRAHAM H. WINKELSTEIN, *Examiner.*